United States Patent
Shtarkman et al.

[19]

[11] Patent Number: 5,517,096
[45] Date of Patent: May 14, 1996

[54] POWER STEERING SYSTEM

[75] Inventors: Emil M. Shtarkman, Southfield; John B. Colletti, Commerce Township, both of Mich.

[73] Assignee: TRW Inc., Lyndhurst, Ohio

[21] Appl. No.: 443,692

[22] Filed: May 18, 1995

Related U.S. Application Data

[63] Continuation of Ser. No. 384,845, Feb. 7, 1995, abandoned.
[51] Int. Cl.$^6$ .................................................. B62D 5/083
[52] U.S. Cl. .................... 318/434; 318/430; 318/473; 180/132; 180/79.1; 180/142; 180/143
[58] Field of Search ...................... 318/280–293, 318/430–474; 180/79.1, 132, 142, 143, 133, 141, 148; 91/375 A, 375 R; 74/388 PS, 866, 867; 137/625.65, 501, 504, 599, 625.24, 625.21

[56] References Cited

U.S. PATENT DOCUMENTS

| | | |
|---|---|---|
| 4,034,825 | 7/1977 | Adams . |
| 4,759,420 | 7/1988 | Schipper, Jr. et al. .................. 180/143 |
| 4,765,427 | 8/1988 | Yonker ..................................... 180/143 |
| 5,086,862 | 2/1992 | Graber et al. ........................... 180/132 |

OTHER PUBLICATIONS

SAE Technical Paper Series, 940867, International Congress & Exposition, Detroit, Michigan Feb. 28–Mar. 3, 1994, "Magnetic Power Steering Assist System–MAGNASTEER", (pp. 57–62) A. Pawlak, D. Graber, D. Eckhardt.

*Primary Examiner*—Paul Ip
*Attorney, Agent, or Firm*—Tarolli, Sundheim, Covell Tummino & Szabo

[57] ABSTRACT

A power steering system includes a housing and a first member supported by the housing for movement relative to the housing. A second member is supported by the housing for movement relative to the housing and the first member. Steerable vehicle wheels are moved in response to relative movement between the first and second members. A power steering resistance control system resists relative movement between the first and second members with a force which varies as a function of variations in vehicle speed. Material is located in a chamber circumscribing the first member. The material has a viscosity which varies as a function of the magnitude of an energy field acting thereon to vary the resistance to relative movement between the first and second members. The energy field is applied to act on the material with a magnitude that varies as a function of the vehicle speed.

34 Claims, 2 Drawing Sheets

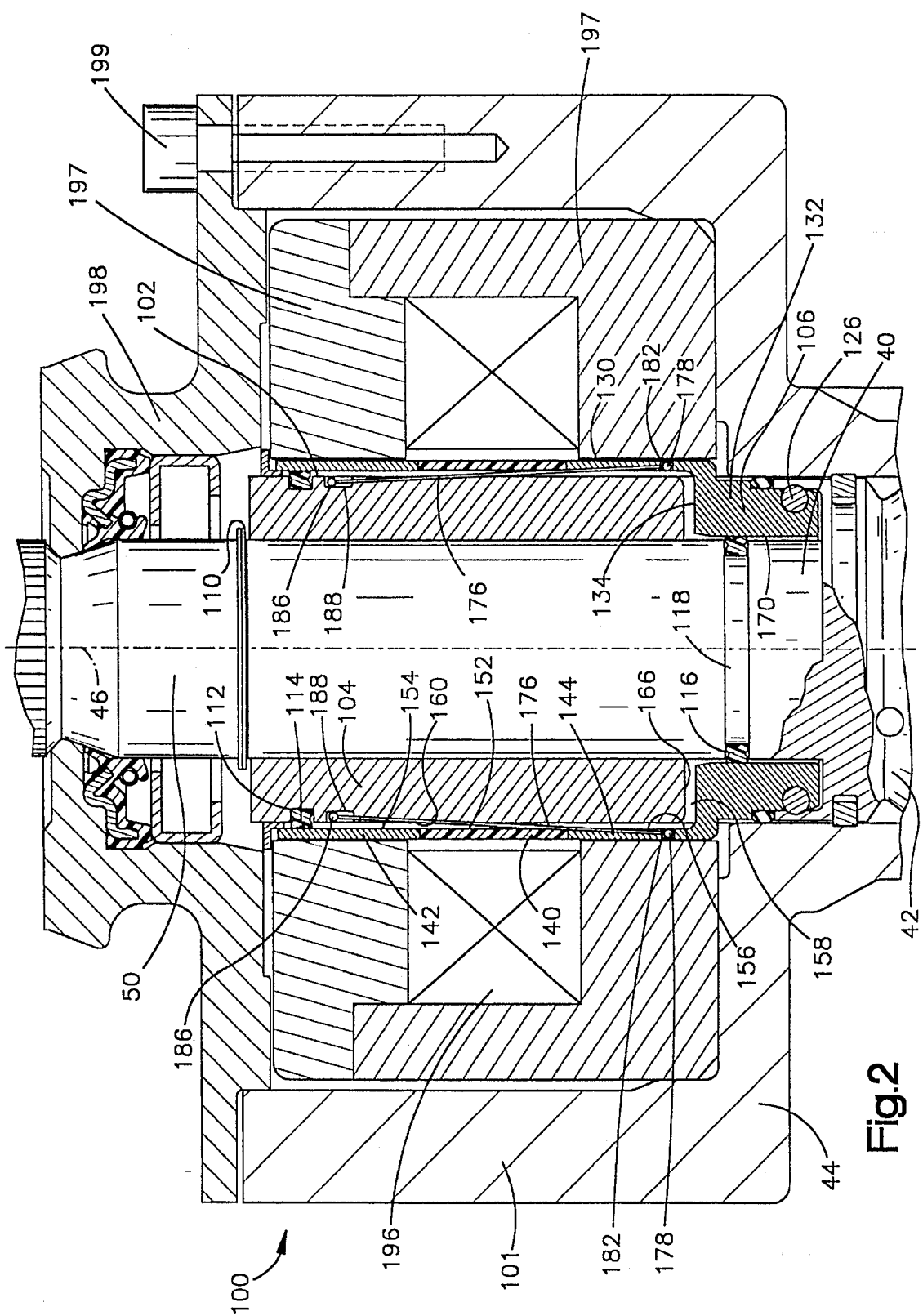

POWER STEERING SYSTEM

This is a continuation of application Ser. No. 08/384,845 filed on Feb. 7, 1995, now abandoned.

BACKGROUND OF THE INVENTION

The present invention relates to a power steering system for vehicles. In particular, the present invention relates to a speed proportional power steering system.

Speed proportional steering systems for vehicles are known. One of the known speed proportional steering systems includes first and second valve members rotatable relative to each other to port fluid to a power steering motor. An increased effort is required to move the first valve member relative to the second valve member as the speed of the vehicle increases.

U.S. Pat. No. 4,034,825 discloses one example of a steering gear in which a higher steering effort is required as vehicle speed increases. A torsion bar located in a power steering valve has balls circumferentially spaced therearound at a location intermediate portions of the torsion bar which are connected to valve members of the power steering valve. The balls are located in V-shaped notches in the torsion bar. Fluid pressure is applied to the balls to force the balls into engagement with surfaces of the V-shaped notches. When the fluid pressure acts on the balls, the location at which force is transmitted between the torsion bar and a valve member changes thereby changing the effective length of the torsion bar. Thus, the effective spring rate of the torsion bar changes to increase the steering effort required to turn the steerable wheels. The fluid pressure is controlled to increase with vehicle speed. This system has the disadvantage that it requires a hydraulic fluid source and mechanical interaction to effect speed proportional steering. These fluid and mechanical features are relatively complex and increase the overall cost of the steering gear.

SUMMARY OF THE INVENTION

The steering system of the present invention provides a controllable resistance to relative movement between first and second members to increase the steering effort as a function of vehicle speed. This is accomplished by the use of a field responsive fluid, such as a magnetic fluid or electroviscous fluid interposed between the first and second members. The viscosity of the field responsive fluid varies as a function of the magnitude of an energy field acting thereon. The magnitude of the energy field is controlled as a function of the speed of the vehicle. Thus, a steering system, according to the present invention, does not require a fluid power source or relatively complex mechanical parts in order to provide a speed proportional steering system.

According to the present invention, a steering system for a vehicle includes a housing and a first member supported by the housing for movement relative thereto. A second member is supported by the housing for movement relative to the housing and the first member. Vehicle wheels are moved in response to relative movement between the first and second members. A material is located in a chamber circumscribing the first member. The material has a viscosity which varies as a function of the magnitude of an energy field acting thereon to vary the resistance to relative movement between the first and second members. The energy field is applied to act on the material with a magnitude that varies as a function of the speed of the vehicle.

The material contained within the chamber is a magnetic fluid or electrorheological fluid and the energy field acting thereon is a magnetic field or an electrical field. A controller controls the magnitude of the field applied to the fluid as a function of receiving a signal from a speed sensor indicative of the speed of the vehicle.

Preferably, the steering system includes return spring means for biasing the first and second members to an initial position. The return spring means is connected to the first member at a location adjacent the chamber. The return spring means is also connected to the second member at a location adjacent the chamber.

The steering gear, if it includes magnetic fluid, further includes means for applying a magnetic field to the magnetic fluid. An electromagnet circumscribes portions of the first and second members that define the chamber. The portion of the second member defining the chamber includes a magnetic portion and a nonmagnetic portion. The electromagnet is spaced from the nonmagnetic portion.

BRIEF DESCRIPTION OF THE DRAWINGS

The foregoing and other features of the present invention will become apparent to one skilled in the art upon reading the following description with reference to the accompanying drawings, wherein:

FIG. 2 is an enlarged portion of the power steering system of FIG. 1 showing means for resisting relative rotation between first and second members of the power steering system.

DESCRIPTION OF THE PREFERRED EMBODIMENT

Figure 1:
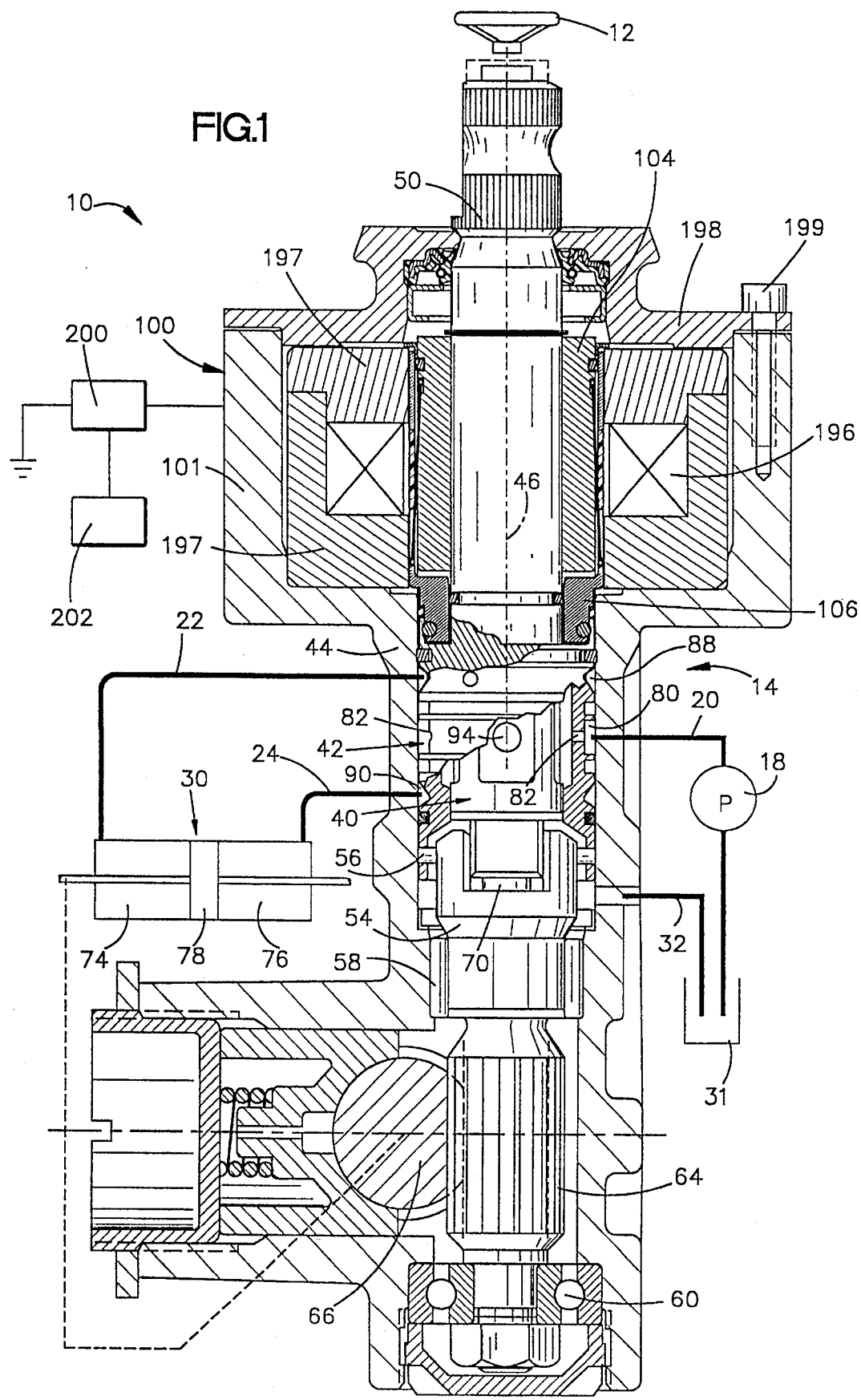
FIG. 1 is a schematic view of a portion of a vehicle power steering system and includes an enlarged sectional view of a power steering control valve.

In the present invention, a vehicle power steering system 10 (FIG. 1) is operable to turn steerable vehicle wheels (not shown) upon rotation of a steering wheel 12 by an operator of the vehicle. Rotation of the steering wheel 12 actuates an open center power steering control valve 14 to port fluid from an engine driven pump 18 and supply conduit 20 to either one of a pair of motor conduits 22 and 24. High pressure fluid conducted from the supply conduit 20 through one of the motor conduits 22 or 24 effects operation of a power steering motor 30 to turn the steerable vehicle wheels. Fluid is conducted from the motor 30 to a reservoir 31 through the other one of the motor conduits 22 or 24, the power steering control valve 14, and a return conduit 32.

The control valve 14 includes an inner valve member 40 and an outer valve member or sleeve 42. The outer valve member 42 is cylindrical and encloses the inner valve member 40. The inner valve member 40 and the outer valve member 42 are rotatable relative to each other and to a housing 44 about a common central axis 46.

The inner valve member 40 is formed as one piece with a cylindrical input shaft or valve stem 50 which is connected with the steering wheel 12. The outer valve member 42 is connected with an output member 54 by a pin 56. The output member 54 is rotatably supported in the housing 44 by bearings 58 and 60. The output member 54 has a pinion gear portion 64 which is in meshing engagement with the toothed portion of a rack 66. The rack 66 is drivingly connected with the power steering motor 30 and the steerable vehicle wheels in a known manner.

The inner valve member 40 and the outer valve member 42 are drivingly interconnected through a resilient torsion bar spring 70 (which is only partially visible in FIG. 1). One end of the torsion bar 70 is connected to the input shaft 50 and the other end of the torsion bar 70 is connected to the output member 54. The torsion bar 70 deflects (twists) to enable relative rotation between the inner and outer valve members 40 and 42 and when free urges the inner and outer valve members to their initial positions, as is well known in the art.

The control valve 14 is of the open center type. Therefore, when the power steering control valve 14 is in an initial or an unactuated condition, fluid pressure from the pump 18 is conducted through the motor conduits 22 and 24 to motor cylinder chambers 74 and 76 on opposite sides of a piston 78 in the power steering motor 30. Also, fluid flow from the pump 18 is directed by the control valve 14 to the return conduit 32 and reservoir 31.

Upon rotation of the steering wheel 12 and rotation of the input shaft 50, friction between the road and the road engaging wheels resists turning of the vehicle wheels generating a torque in the steering linkage between the ground wheels and the steering wheel. In response to this torque, the inner valve member 40 will be rotated about the axis 46 relative to the outer valve member 42. This relative rotation moves valving edges on the inner valve member 40 relative to valving edges on the outer valve member 42 to direct high pressure fluid from the pump 18 to one of the motor conduits 22 or 24 and directs fluid from the other motor conduit to the reservoir 31.

For example, rotation of the inner valve member 40 in one direction relative to the outer valve member 42 will reduce the extent of communication of the motor conduit 22 with the reservoir 31 and increase the extent of communication of the motor conduit 22 with the pump 18. This results in high pressure fluid from the pump 18 being conducted to the motor cylinder chamber 74. This high pressure fluid moves the piston 78 toward the right (as viewed in FIG. 1). As the piston 78 moves toward the right (as viewed in FIG. 1), fluid discharged from the chamber 76 is conducted through the motor conduit 24 to the reservoir 31 through the return conduit 32 and the control valve 14.

As the power steering motor 30 operates, the rack 66 rotates the pinion 64 and the output member 54. This rotates the outer valve member 42 relative to the inner valve member 40 returning it to a neutral condition. When the power steering motor 30 is operated to turn the steerable vehicle wheels to an extent corresponding to the extent of rotation of the inner valve member 40, the rack 66 rotates the pinion 64 through a distance sufficient to move the outer valve member 42 to its initial position relative to the inner valve member. When this occurs, the fluid pressure in the motor cylinder chambers 74 and 76 equalizes and the motor 30 stops operating.

Pressurized fluid from the pump 18 is conducted to an annular central groove 80 formed in the outer valve member 42. Fluid flows to the inside of the outer valve member 42 through a pair of diametrically opposite passages 82. The inner and outer valve members 40 and 42 may have the same construction and cooperate with each other and the torsion bar 70 in the same manner as described in U.S. Pat. No. 4,276,812, issued Jul. 7, 1981 and entitled "Power Steering Valve and Method of Making Same". However, the inner and outer valve members 40 and 42 could have a different construction if desired.

The inner valve member 40 has a generally square cross sectional configuration with rounded corners which cooperate with axially extending grooves formed inside the outer valve member 42 to control the flow of fluid to and from the motor 30. The ends of one pair of diametrically opposite grooves on the inside of the outer valve member 42 are connected in fluid communication with an annular outer groove 88 connected with the motor conduit 22. A second pair of diametrically opposite axially extending grooves on the inside of the outer valve member 42 are connected in fluid communication with an annular outer groove 90 formed in the outer valve member and connected with the motor conduit 24. A pair of diametrically opposite openings 94 extend radially inwardly to an axially extending central passage in the inner valve member 40. The central passage is connected in fluid communication with the return conduit 32.

A field responsive control device 100 (FIG. 2) resists relative rotation between the inner and outer valve members 40 and 42. The fluid control device 100 is located in a larger diameter cylindrical portion 101 of the housing 44 and includes a chamber 102 located between a bushing 104 connected with the input shaft 50 and a cylindrical member 106 connected with the outer valve member 42. A field responsive fluid such as a magnetic fluid or an electroviscous fluid, preferably a magnetic fluid, is disposed in the chamber 102. The viscosity of the magnetic fluid varies as a function of a magnetic field applied to the magnetic fluid. As the viscosity of the magnetic fluid in the chamber 102 increases, the resistance to relative rotation between the inner and outer valve members 40 and 42 increases.

A ring 110 connected with the input shaft 50 prevents axial movement of the bushing 104 relative to the input shaft. The bushing 104 includes an annular groove 112 for receiving an O-ring 114. The O-ring 114 defines an axial end of the chamber 102. The other axial end of the chamber 102 is defined by an O-ring 116 received in a groove 118 in the input shaft 50.

The cylindrical member 106 is connected to the outer valve member 42 by a pin 126. Accordingly, the cylindrical member 106 rotates along with the outer valve member 42 relative to the bushing 104 and the input shaft 50. The cylindrical member 106 includes a relatively thin walled cylindrical portion 130 circumscribing the bushing 104. The cylindrical member 106 includes a relatively thick walled portion 132 extending from the portion 130 and connected to the outer valve member 42. The portion 130 and the portion 132 define a shoulder 134.

The portion 130 of the cylindrical member 106 includes a nonmagnetic portion 140. Magnetic portions 142 and 144 are located at opposite axial ends of the nonmagnetic portion 140. The magnetic portion 144 extends from the portion 132 of the cylindrical member 106.

The chamber 102 is defined by radially inner surfaces 152, 154, and 156 of the portions 140, 142, and 144 of the cylindrical member 106, respectively. A radially extending portion 158 of the chamber 102 is defined by the shoulder 134 and an axial end surface 166 of the bushing 104. The O-ring 114 located in the annular groove 112 in the bushing 104 engages the radially inner surface 154 of the portion 142 to define one axial end of the chamber 102. The O-ring 116 located in the annular groove 118 in the input shaft 50 engages a radially inner surface 170 of the portion 132 of the cylindrical member 106 to define the other axial end of the chamber 102.

A plurality of resilient members 176, preferably thin steel bars, extend from the bushing 104 to the portion 130 of the cylindrical member 106 and through the chamber 102.

Preferably, there are four resilient members 176, two of which are shown in FIG. 2, equally spaced about the bushing 104. One end 178 of each of the resilient members 176 is fixedly located in one of a plurality of a recesses 182 in the portion 144 of the cylindrical member 106. The other end 186 of each of the resilient members 176 is located in one of a plurality of axially extending slots 188 in the bushing 104.

The ends 178 of the resilient members 176 rotate along with the cylindrical member 106 relative to the bushing 104. Each of the ends 186 of the resilient members 176 rotates with the bushing 104 relative to the cylindrical member 106 and moves along its respective slot 188 during rotation of the bushing 104 relative to the cylindrical member 106. The resilient members 176 deflect to enable relative rotation between the bushing 104 and the cylindrical member 106 and when free urge the bushing and the cylindrical member to their initial positions along with the torsion bar 70.

In order to apply the magnetic field to the magnetic fluid disposed in the chamber 102, an electromagnet including an electromagnet coil 196 and armatures 197 circumscribes the portion 130 of the cylindrical member 106 and the bushing 104. When the electromagnet 196, 197 applies a magnetic field, the viscosity of the magnetic fluid disposed in the chamber 102 is established as a function of the magnitude of the magnetic field. The electromagnet coil 196 is spaced radially from the nonmagnetic portion 140 of the cylindrical member 106.

The cylindrical portion 101 of the housing 44 encloses the electromagnet 196 and 197, bushing 104, and cylindrical member 106. A cover 198 is connected to the cylindrical portion 101 by a plurality of bolts 199, one of which is shown in FIG. 2.

The electromagnet 196 is connected to a power source of the vehicle through an electronic control unit (ECU) 200 (FIG. 1). The ECU 200 is also connected with a sensor 202. The sensor 202 senses the speed of the vehicle and generates a signal indicative of the speed of the vehicle in a known manner. A signal from the sensor 202 is received by the ECU 200. The ECU 200 is programmed to control the magnitude of the magnetic field applied to the magnetic fluid as a function of the speed of the vehicle.

When the vehicle is travelling at a relatively low speed, the ECU 200, under program control, applies little or no magnetic field to the magnetic fluid in the chamber 102. Thus, very little resistance is exerted by the magnetic fluid to relative rotation between the input shaft 50 and the output member 54. This is desirable, because at such relatively low speeds, as encountered during a parking maneuver, for example, it is desirable that the entire steering force be applied to the steerable wheels to guide the vehicle.

The ECU 200 is also programmed to apply a relatively large magnetic field to the magnetic fluid in the chamber 102, when the vehicle is travelling at a relatively high speed, such as would be encountered during highway travel. When a relatively large magnetic field is applied to the magnetic fluid, its viscosity increases and resists relative movement between the inner valve member 40 and the outer valve member 42 as a function of the magnitude of the magnetic field. Thus, the operator encounters a very stiff steering "feel" at relatively high vehicle speeds.

Although the present invention discloses the use of a magnetic fluid and electromagnet, the chamber may be filled with an electroviscous fluid and the electromagnet replaced by electrical leads. Also, the present invention may be incorporated into any power steering system such as an electric power steering system.

From the above description of the invention, those skilled in the art will perceive improvements, changes and modifications. Such improvements, changes and modifications within the skill of the art are intended to be covered by the appended claims.

Having described the invention, the following is claimed:

1. A steering system comprising:

a housing;

a first member supported by said housing for movement relative to said housing;

a second member supported by said housing for movement relative to said housing and said first member;

means for moving steerable vehicle wheels in response to relative movement between said first and second members;

means for resisting relative movement between said first and second members with a force which varies as a function of variations in vehicle speed, said resisting means including surface means defining a chamber circumscribing said first member and disposed in said housing, and material located in said chamber having a viscosity which varies as a function of the magnitude of an energy field acting thereon to vary the resistance to relative movement between said first and second members; and means for applying the energy field to act on said material, the energy field having a magnitude which varies as a function of the speed of the vehicle.

2. A steering system as set forth in claim 1 wherein said chamber is disposed between said first and second members.

3. A steering system as set forth in claim 2 wherein said second member includes a cylindrical portion circumscribing said first member, said cylindrical portion having a radially inner surface and said first member having a radially outer surface, said radially inner surface of said second member and said radially outer surface of said first member defining said chamber so that said material is disposed between said first and second members.

4. A steering system as set forth in claim 3 wherein said energy applying means includes an electromagnet circumscribing said cylindrical portion of said second member.

5. A steering system as set forth in claim 4 wherein said cylindrical portion of said second member includes a magnetic portion.

6. A steering system as set forth in claim 5 wherein said cylindrical portion of said second member includes a nonmagnetic portion located adjacent said electromagnet.

7. A steering system as set forth in claim 6 wherein said electromagnet is spaced radially from said non-magnetic portion of said cylindrical portion.

8. A steering system as set forth in claim 3 further including a torsion bar having one end connected with said first member and another end connected with said second member, said torsion bar biasing said first and second members to an initial position.

9. A steering system as set forth in claim 8 further including a return spring means for biasing said first and second members to the initial position, said return spring means having a first end portion connected with said first member and movable relative to said cylindrical portion of said second member along with said first member, said return spring means having a second end portion connected with said cylindrical portion of said second member and movable with said cylindrical portion relative to said first member.

10. A steering system as set forth in claim 9 wherein said return spring means comprises a plurality of resilient members connected between said first member and said cylindrical portion, each of said resilient members having a first end connected to said first member and a second end connected to said cylindrical portion.

11. A steering system as set forth in claim 10 wherein at least one of said first member and said cylindrical portion includes a plurality of axially extending slots, each of said resilient members having one of said first and second ends located in one of said slots, said ends of said resilient members moving relative to said slots in response to relative movement between said first member and said cylindrical portion.

12. A steering system as set forth in claim 11 wherein said plurality of slots are located in said first member.

13. A steering system as set forth in claim 1 wherein said first member is connected with a first valve member and said second member is connected with a second valve member, said first and second valve members being movable relative to each other to port fluid to a power steering motor.

14. A steering system comprising:
a housing;
a first member supported by said housing for movement relative to said housing;
a second member supported by said housing for movement relative to said housing and said first member;
means for moving steerable vehicle wheels in response to relative movement between said first and second members;
means for resisting relative movement between said first and second members, said resisting means including surface means defining a chamber circumscribing said first member and disposed in said housing, and material located in said chamber having a viscosity which varies as a function of the magnitude of an energy field acting thereon to vary the resistance to relative movement between said first and second members;
means for applying the energy field to act on the material, the energy field having a magnitude which varies as a function of the speed of the vehicle;
return spring means for biasing said first and second members to an initial position, said return spring means being connected to said first member at a location adjacent said chamber, said return spring means being connected to said second member at a location adjacent said chamber.

15. A steering system as set forth in claim 14 wherein said return spring means extends through said chamber.

16. A steering system as set forth in claim 14 wherein said return spring means includes a resilient member having one end portion connected with said first member and movable with said first member relative to said second member, said resilient member having a second end portion connected with said second member and movable with said second member relative to said first member.

17. A steering system as set forth in claim 16 wherein said first member includes a slot for receiving said first end portion of said resilient member, said first end portion of said resilient member moving relative to said first member along said slot upon relative movement between said first and second members.

18. A steering system as set forth in claim 14 wherein said energy applying means includes an electromagnet circumscribing portions of said first and second members.

19. A steering system as set forth in claim 18 wherein said portion of said second member circumscribed by said electromagnet includes a magnetic portion.

20. A steering system as set forth in claim 19 wherein said electromagnet is spaced from said first and second members.

21. A steering system as set forth in claim 19 wherein said portion of said second member circumscribed by said electromagnet includes a non-magnetic portion.

22. A steering system as set forth in claim 14 wherein said first member is connected with a first valve member and said second member is connected with a second valve member, said first and second valve members being movable relative to each other to port fluid to a power steering motor.

23. A steering system as set forth in claim 14 further including a torsion bar connected with said first and second members.

24. A steering system comprising:
a housing;
a first member supported by said housing for movement relative to said housing;
a second member supported by said housing for movement relative to said housing and said first member;
means for moving steerable vehicle wheels in response to relative movement between said first and second members;
said first and second members including portions defining a chamber disposed between said first and second members in said housing;
material located in said chamber having a viscosity which varies as a function of the magnitude of a magnetic energy field acting thereon to vary the resistance to relative movement between said first and second members; and
an electromagnet circumscribing said portions of said first and second members and said chamber for applying the energy field to act on said material having a magnitude which varies as a function of the speed of the vehicle;
said portion of said second member defining said chamber including a magnetic portion and a non-magnetic portion, said non-magnetic portion being located adjacent said electromagnet.

25. A steering system as set forth in claim 24 wherein said portion of said second member defining said chamber is cylindrical, said portion of said second member defining said chamber including first and second cylindrical magnetic portions located on opposite axial ends of said non-magnetic portion.

26. A steering system as set forth in claim 24 wherein said non-magnetic portion of said second member defining said chamber is spaced radially from said electromagnet.

27. A steering system as set forth in claim 24 further including a plurality of resilient members connected between said portions of said first and second members defining said chamber for biasing said first and second members to an initial position.

28. A steering system as set forth in claim 24 further including first and second valve members movable relative to each other to port fluid to a power steering motor, said first valve member being connected with said first member, said second valve member being connected with said second member.

29. A steering system comprising:
a housing;
first and second valve members movable relative to each other to port fluid to a power steering motor;
a first member connected with said first valve member for movement along with said first valve member;
a second member connected with said second valve member for movement along with said second member;

said first and second members including portions defining a chamber disposed between said first and second members in said housing;

material located in said chamber having a viscosity which varies as a function of the magnitude of a magnetic energy field acting thereon to vary the resistance to relative movement between said first and second members; and an electromagnet circumscribing said portions of said first and second members and said chamber for applying the energy field to act on said material having a magnitude which varies as a function of the speed of the vehicle;

said portion of said second member defining said chamber including a magnetic portion and a non-magnetic portion, said non-magnetic portion being located adjacent said electromagnet, return spring means for biasing said first and second members to an initial position, said return spring means being connected to said first member at a location adjacent said chamber, said return spring means being connected to said second member at a location adjacent said chamber.

30. A steering system as set forth in claim 29 wherein said portion of said second member defining said chamber is cylindrical, said portion of said second member defining said chamber including first and second cylindrical magnetic portions located on opposite axial ends of said non-magnetic portion.

31. A steering system as set forth in claim 30 wherein said non-magnetic portion of said second member defining said chamber is spaced radially from said electromagnet.

32. A steering system as set forth in claim 29 wherein said return spring means extends through said chamber.

33. A steering system as set forth in claim 29 wherein said return spring means includes a resilient member having one end portion connected with said first member and movable with said first member relative to said second member, said resilient member having a second end portion connected with said second member and movable with said second member relative to said first member.

34. A steering system as set forth in claim 33 wherein said first member includes a slot for receiving said first end portion of said resilient member, said first end portion of said resilient member moving relative to said first member along said slot upon relative movement between said first and second members.

* * * * *